Patented Oct. 26, 1948

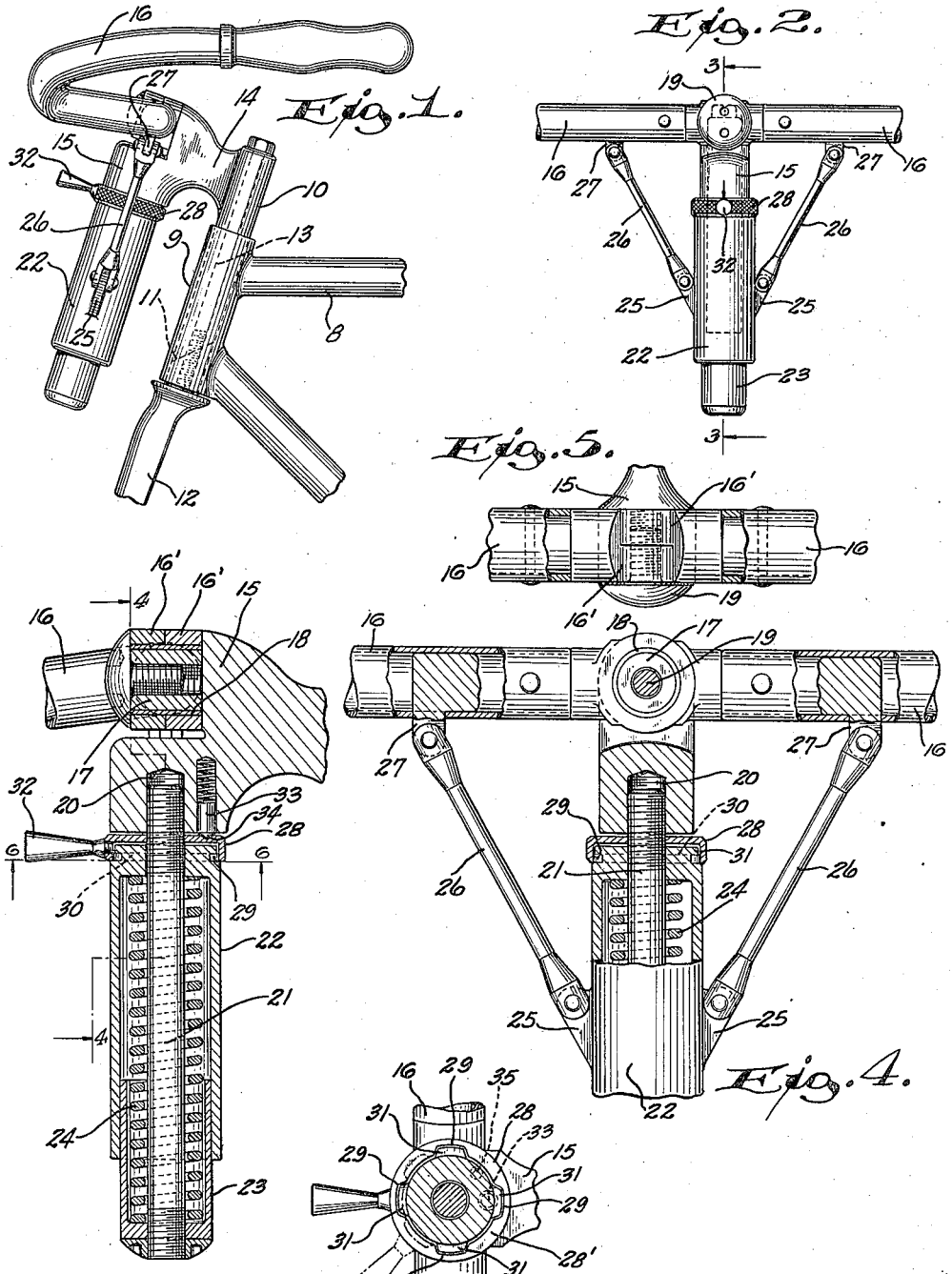

2,452,371

UNITED STATES PATENT OFFICE 2,452,371

HANDLE BAR SHOCK ABSORBER

Joseph Paul Guttormsen, Kenosha, Wis.

Application November 9, 1945, Serial No. 627,612

11 Claims. (Cl. 74—551.2)

This invention relates to improvements in handle bar shock absorbers, particularly adapted for inclusion in the handle bar unit of a cycle such as a bicycle, motorcycle or the like.

A primary object of the invention is to provide a cycle handle bar shock absorber of simple and efficient construction, adapted to take up or reduce the vibratory strain and shock to the rider transmitted through the rider's arms which are in engagement with the handle bars for cycle steering purposes.

A more specific object of the invention is to provide a cycle handle bar shock absorber wherein the handle bar is formed of two companion arms extending laterally in opposite directions and hingedly connected together at their adjacent inner ends, the hinged movement of the handle bar arms to absorb or counteract jolts and shocks being opposed by a yieldingly mounted sleeve connected with each handle bar arm.

A further object of the invention is to provide a handle bar shock absorber which may be manually adjusted to render the shock absorber active or inactive, at will.

A further object of the invention is to provide a cycle handle bar shock absorber associated with a cycle handle bar structure as a unit and adapted for incorporation in standard bicycles, motorcycles and the like.

A further object of the invention is to provide a handle bar shock absorber which may be mounted in the standard steering head of a conventional cycle.

A further object of the invention is to provide a cycle handle bar shock absorber which is of very simple construction, is strong and durable and effective in operation, which is inexpensive to manufacture, which is easy to mount on a cycle, and which is well adapted for the purposes described.

With the above and other objects in view, the invention consists of the improved cycle handle bar shock absorber and its parts and combinations as set forth in the claims, and all equivalents thereof.

In the accompanying drawing in which the same reference characters indicate the same parts in all of the views:

Fig. 1 is a fragmentary side view of the steering head end portion of a cycle frame showing the improved handle bar and shock absorber unit mounted thereon;

Fig. 2 is a fragmentary front view of the improved handle bar and shock absorber unit;

Fig. 3 is an enlarged, fragmentary, vertical sectional view taken on line 3—3 of Fig. 2;

Fig. 4 is a fragmentary, detail, sectional view taken on line 4—4 of Fig. 3, with other parts broken away and in section to show structural features;

Fig. 5 is a fragmentary plan view of the hingedly connected inner ends of the handle bar arms, with parts broken away and in section; and Fig. 6 is a fragmentary, detail, sectional view taken on line 6—6 of Fig. 3.

The present improvements are embodied in a handle bar unit for cycles, which unit is adapted to replace the ordinary handle bar structure relative to its mounting in the steering head of the cycle frame.

Referring now more particularly to the drawing, it will appear that the front end portion of a cycle frame is indicated by the numeral 8. Said portion of the frame includes an upwardly opening socket-like steering head 9 which is adapted to rotatably receive the steering post of a handle bar structure.

In the present improvements a handle bar steering post is indicated by the numeral 10 and said post is adapted to be rotatably mounted within the frame steering head 9, in the conventional manner shown in Fig. 1. The steering post 10 is connected within the socket of the steering head 9 with the stud portion 11 of the cycle front wheel fork 12 by an elognated connecting bolt 13.

Mounted forwardly of the upper outer end portion of the steering post 10 by means of a web 14, is a shouldered head 15 within the shouldered portion of which are hingedly mounted and connected, the companion inner end portions 16' of independent laterally projecting handle bar arms 16 (see Figs. 3 and 5). The companion engaging inner end portions of the handle bar arms 16 are bored to receive a bushing 17 and a sleeve 18. The bushing 17 is formed with a tapped bore into which a headed bolt 19 is removably threaded for the purpose of effecting the hinged connection between the handle bar arms.

The lower portion of the head 15 has therein a downwardly opening threaded aperture 20, and by means of an elongated attaching bolt 21 a shock absorber sleeve 22 is vertically reciprocably depended from the lower bearing face of the head 15, with the connecting bolt 21 serving as a guide for said sleeve. Telescopically mounted in the lower end portion of the sleeve 22 and projecting therebelow is a cupped member 23 into whose lower end portion the lower end of the bolt 21 is threaded. Within the registering cavities of the cupped member 23 and the sleeve 2, and surrounding the bolt 21, is a confined coiled spring 24 whose opposite extremities bear respectively against a top wall portion of the sleeve 22 and the lower end of the cupped member 23.

Opposite sides of the sleeve 22 are formed with integral lugs or webs 25 to which are pivotally attached the lower ends of angularly directed connecting rods 26. The upper end of each rod is pivotally attached to a depending lug 27 anchored to the adjacent handle bar arm 16.

The result of the mechanism described is that at all times the confined coiled spring 24 is exerting an expansive force against the cup 23 and the upper end of the sleeve 22, thereby normally maintaining the yielding sleeve 22 in its uppermost position relative to the anchoring bolt 21 and in adjacency relative to the bearing face of the handle bar carrying head 15. The inner ends of the handle bar arms 16 are hingedly connected for independent movement relative to each other, but both handle bar arms 16 are operatively connected with the yielding sleeve 22 through the medium of the connecting rods 26. When the cycle is being ridden and when a locking ring, later to be described, is in its inactive position, undue pressure exerted on either or both of the handle bar arms 16 by the rider's arms as a result of jolts or bumps reacting on the cycle, will cause the handle bar arms 16 to hinge or fold downwardly slightly with such movements being opposed and absorbed by the spring urged yielding sleeve 22.

Revolubly mounted on an upper end portion of the bolt 21, between the adjacent ends of the head 15 and the sleeve 22, is a locking collar 28. Said collar is formed with a downturned peripheral flange terminating in an inturned horizontal, annular rim 28' (see Fig. 6), which rim has spaced slots or serrations 29 therein. The upper end of the sleeve 22 is shouldered and is formed with an annular groove 30 engaged by the inturned rim 28' of the locking collar 28. The portion of the end of the sleeve 22 over the groove 30 is formed with spaced outwardly projecting protuberances or lugs 31 adapted, when the locking ring 28 is turned in a neutral or inactive position, to register with the locking ring slots or openings 29. A forward portion of the locking ring 28 has affixed thereto an outwardly projecting lever or handle 32. In the position of the locking ring 28 wherein the rim recesses 29 register with the sleeve lugs 31, the handle 32 assumes a central forwardly projecting position and the locking ring is releasably held in said neutral position by a spring urged detent 33 engaging a recess 34 therefor in the top surface of the locking ring.

When the locking ring is in the neutral or inactive position mentioned, and as illustrated in full lines in the drawing, the yielding sleeve 22 is free to reciprocate on the stem 21 in response to pressure urges transmitted thereto from the handle bar arms 16 through the rods 26. As thus arranged, the shock absorber for the handle bar structure is in active condition. There may, however, be times during the operation of the cycle wherein it is desired to take the handle bar shock absorber out of play and to render the mounting of the handle bar arms 16 rigid. This is simply accomplished manually by turning the locking ring through a slight arc, as indicated in broken lines in Fig. 6. Through a proper movement of the locking ring accomplished by manual pressure on the handle 32 sufficient to release the spring urged detent 33 and to engage said detent with another socket 35 in the locking ring, the locking ring slots 29 are brought out of registration with the sleeve ears 31 and said sleeve ears are then confined by those portions of the locking ring flange 28 between the apertures. This movement of the locking ring in effect serves to positively connect the sleeve 22 to the head 15 to prevent yielding reciprocations of the sleeve and thus the shock absorber is rendered inactive through the manipulation described.

From the foregoing description, it will be seen that the improved handle bar shock absorber is associated with handle bar arms as a unit and such unit is readily adapted for easy mounting in a standard cycle frame. A cycle thus equipped enhances the comfort of the rider through absorbing jolts which might be transmitted to the rider through the handle bars. The improved shock absorber is readily and quickly adjustable to render it active or inactive, and the unit is furthermore well adapted for the purposes described.

What is claimed as the invention is:

1. A handle bar structure for cycles, comprising a support, a pair of oppositely directed handle bar arms independently hingedly mounted at their adjacent inner ends on the support, a shock absorber connected with both of said handle bar arms to yieldingly, equalizingly resist hinging movement of the same, and means for selectively rendering said shock absorber active or inactive.

2. A unitary handle bar structure for cycles, comprising a cycle-carried steering head, a support having a portion turnably mounted in the steering head, said support also having a forwardly off-set portion, a pair of oppositely directed handle bar arms independently pivotally mounted at their adjacent inner ends on an off-set portion of the support for movement in a direction responsive to jolt-initiated pressures exerted thereon by the cycle rider, a shock absorber resiliently depended from an off-set portion of the support, and an arm hingedly interposed between each handle bar arm and the shock absorber.

3. A handle bar structure for cycles, comprising a cycle-carried steering head, a support having a stem and a bearing portion off-set from the stem, the stem being turnably mounted in the steering head, a pair of oppositely directed handle bar arms pivotally mounted at their adjacent inner ends on the bearing portion of the support, a shock absorber, rigid connections hingedly interposed between the shock absorber and each handle bar arm, and means yieldingly mounting the shock absorber on the bearing portion of the support.

4. A handle bar structure for cycles, comprising a cycle-carried steering head, a support having a stem and a bearing portion off-set from the stem, the stem being turnably mounted in the steering head, a pair of oppositely directed handle bar arms independently pivotally mounted at their adjacent inner ends on the bearing portion of the support, a shock absorber, a separate connection hingedly interposed between the shock absorber and each handle bar arm, a normally resilient means for mounting the shock absorber on the bearing portion of the support, and manually adjustable means for converting said resilient means to a rigid means.

5. A handle bar structure for cycles, comprising a steering head, a support having a portion turnably engaging the steering head, a pair of oppositely directed handle bar arms independently hingedly mounted at their adjacent inner ends on the support for movement in a direction responsive to varying manual pressure exerted thereon, a shock absorber normally resiliently depended from said support and movably connected with each handle bar arm, and manually operated means for effecting a rigid connection between the support and the shock absorber.

6. A unitary handle bar structure for cycles, comprising a cycle-carried steering head, a support having a portion turnably mounted in the steering head, said support also having a forwardly off-set portion, a pair of oppositely directed handle bar arms pivotally mounted at their adjacent inner ends on an off-set portion of the support for movement in a direction responsive to jolt-initiated pressures exerted thereon by the cycle rider, a stem depended from the support off-set, a cup carried by an outer portion of the stem, a sleeve slidably associated with the stem and cup, a spring within the sleeve and cup and exerting yielding pressure against opposite ends of the same, and rods interposed between the sleeve and both handle bar arms and hingedly connected to the same.

7. A unitary handle bar structure for cycles, comprising a cycle-carried steering head, a support having a portion turnably mounted in the steering head, said support also having a forwardly off-set portion, a pair of oppositely directed handle bar arms pivotally mounted at their adjacent inner ends on an off-set portion of the support for movement in a direction responsive to jolt-initiated pressure exerted thereon by the cycle rider, a stem depended from the support off-set, a cup carried by an outer portion of the stem, a sleeve slidably associated with the stem and cup, a spring within the sleeve and cup and exerting yielding pressure against opposite ends of the same, and a pair of angularly directed rods, each being interposed between opposite side portions of the sleeve and a separate handle bar arm, and each rod being pivotally connected at its extremities to a handle bar arm and to the sleeve.

8. A unitary handle bar structure for cycles, comprising a cycle-carried steering head, a support having a portion turnably mounted in the steering head, said support also having a forwardly off-set portion, a pair of oppositely directed handle bar arms pivotally mounted at their adjacent inner ends on an off-set portion of the support for movement in a direction responsive to jolt-initiated pressures exerted thereon by the cycle rider, a stem depended from the support off-set, a cup carried by an outer portion of the stem, a sleeve slidably associated with the stem and cup, a spring within the sleeve and cup and exerting yielding pressure against opposite ends of the same, rods interposed between the sleeves and both handle bar arms and hingedly connected to the same, and manually adjustable means for rigidly connecting the sleeve to the support to prevent yielding reciprocations of the sleeve.

9. A unitary handle bar structure for cycles, comprising a cycle-carried steering head, a support having a portion turnably mounted in the steering head, said support also having a forwardly off-set portion, a pair of oppositely directed handle bar arms pivotally mounted at their adjacent inner ends on an off-set portion of the support for movement in a direction responsive to jolt-initiated pressures exerted thereon by the cycle rider, a stem depended from the support off-set, a cup carried by an outer portion of the stem, a sleeve slidably associated with the stem and cup, a spring within the sleeve and cup and exerting yielding pressure against opposite ends of the same, rods interposed between the sleeves and both handle bar arms and hingedly connected to the same, and a ring rotatably carried by an inner portion of the stem and movable to lockingly engage an inner end of the sleeve to restrain yielding, reciprocatory movement thereof.

10. A handle bar structure for cycles, comprising a support, a pair of oppositely directed handle bar arms pivotally mounted at their adjacent inner ends on the support for movement in a direction responsive to jolt-initiated pressures exerted thereon by the cycle rider, a stem depended from the support, a cup carried by an outer portion of the stem, a sleeve slidably associated with the stem and cup, a spring within the sleeve and cup and exerting yielding pressure against opposite ends of the same, and rods interposed between the sleeve and both handle bar arms and hingedly connected to the same.

11. A handle bar structure for cycles, comprising a support, a pair of oppositely directed handle bar arms pivotally mounted at their inner ends on the support for movement in a direction responsive to jolt-initiated pressures exerted thereon by the cycle rider, a shock absorber, rigid connections hingedly interposed between the shock absorber and each handle bar arm, and means yieldingly mounting the shock absorber on the support.

JOSEPH PAUL GUTTORMSEN.

REFERENCES CITED

The following references are of record in the file of this patent:

UNITED STATES PATENTS

| Number | Name | Date |
|---|---|---|
| 402,143 | Colling | Apr. 30, 1889 |
| 675,927 | Boehm et al. | June 11, 1901 |

FOREIGN PATENTS

| Number | Country | Date |
|---|---|---|
| 3,128 | Great Britain | 1913 |
| 38,871 | Denmark | June 4, 1928 |
| 363,986 | France | May 18, 1906 |
| 497,558 | France | Sept. 17, 1919 |